(12) United States Patent
Kwa et al.

(10) Patent No.: US 7,237,131 B2
(45) Date of Patent: Jun. 26, 2007

(54) TRANSACTION-BASED POWER MANAGEMENT IN A COMPUTER SYSTEM

(75) Inventors: Seh W. Kwa, San Jose, CA (US); Siripong Sritanyaratana, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 430 days.

(21) Appl. No.: 10/749,855

(22) Filed: Dec. 30, 2003

(65) Prior Publication Data

US 2005/0149768 A1 Jul. 7, 2005

(51) Int. Cl.
G06F 1/26 (2006.01)
G06F 1/32 (2006.01)

(52) U.S. Cl. ............ 713/323; 713/300; 713/320; 713/323; 713/330; 710/53; 710/56; 710/57; 710/310; 709/231; 709/232; 709/233; 709/235

(58) Field of Classification Search ............ 713/300, 713/320, 323, 330; 710/53, 56, 57, 310; 709/231, 232, 233, 235, 2
See application file for complete search history.

(56) References Cited

U.S. PATENT DOCUMENTS

| 5,721,935 | A | * | 2/1998 | DeSchepper et al. | ........ | 713/323 |
| 6,085,330 | A | * | 7/2000 | Hewitt et al. | ................ | 713/322 |
| 6,128,745 | A | * | 10/2000 | Anderson et al. | ............ | 713/323 |
| 6,357,013 | B1 | * | 3/2002 | Kelly et al. | ................... | 713/324 |
| 6,820,169 | B2 | * | 11/2004 | Wilcox et al. | ............... | 711/105 |
| 2003/0137945 | A1 | * | 7/2003 | Yavalkar et al. | ............. | 370/282 |
| 2004/0212678 | A1 | * | 10/2004 | Cooper et al. | .............. | 348/155 |
| 2005/0025119 | A1 | * | 2/2005 | Pettey et al. | ................. | 370/351 |
| 2005/0044448 | A1 | * | 2/2005 | Verdun | ......................... | 714/22 |
| 2005/0088445 | A1 | * | 4/2005 | Gonzalez et al. | ............ | 345/502 |
| 2006/0018342 | A1 | * | 1/2006 | Pettey et al. | ................. | 370/465 |

FOREIGN PATENT DOCUMENTS

EP 1 338 948 A 8/2003

OTHER PUBLICATIONS

European Patent Office, "International Search Report" for International Application No. PCT/ US2004/043675, mailed Oct. 10, 2005 6 pages.

(Continued)

Primary Examiner—Rehana Perveen
Assistant Examiner—Nitin C. Patel
(74) Attorney, Agent, or Firm—Blakely, Sokoloff, Taylor & Zafman LLP

(57) ABSTRACT

A method and an apparatus for power management in a computer system have been disclosed. One embodiment of the method includes monitoring transactions over an interconnect coupling a chipset device and a peripheral device in the system, the transactions being transmitted between the peripheral device and the chipset device according to a flow control protocol to allow the chipset device to keep track of the transactions, and causing a processor in the system to exit from a power state if a plurality of coherent transactions pending in a buffer of the chipset device exceeds a first threshold. Other embodiments are described and claimed.

24 Claims, 5 Drawing Sheets

OTHER PUBLICATIONS

European Patent Office, "Written Opinion" for International Application No. PCT/US2004/043675, mailed 10/10/2005, 5 pages.
"PCI Express Base Specification," Revision 1.0a, Apr.15, 2003, pp. 1-426.
"Advanced Configuration and Power Interface Specification," Compaq Computer Corporation, Intel Corporation, Phoenix Technologies Ltd., Toshiba Corporation; Revision 2.0 Jul. 27, 2000, pp. 1-467.

* cited by examiner

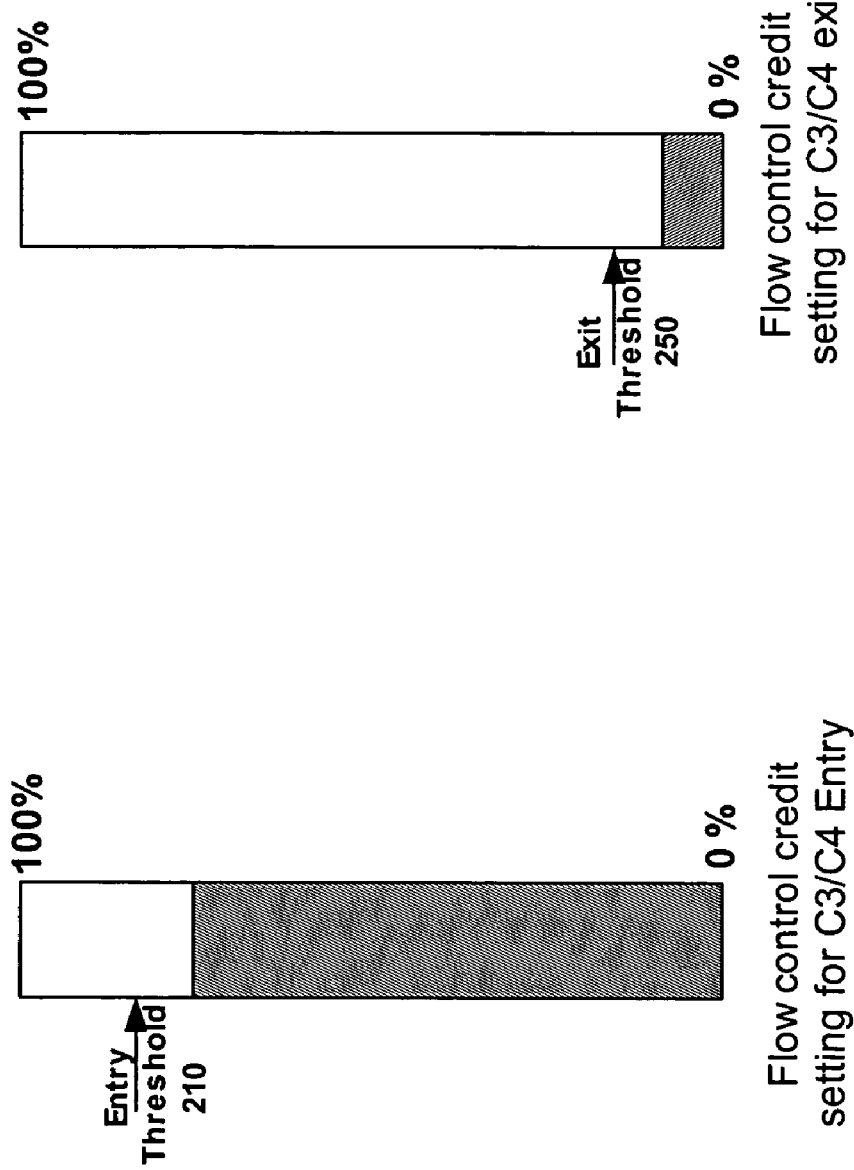

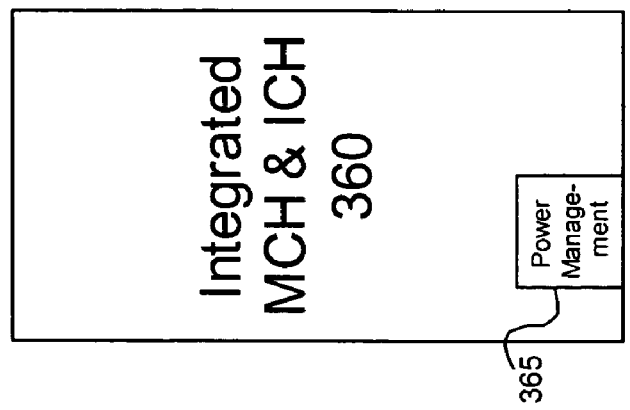
Figure 3C
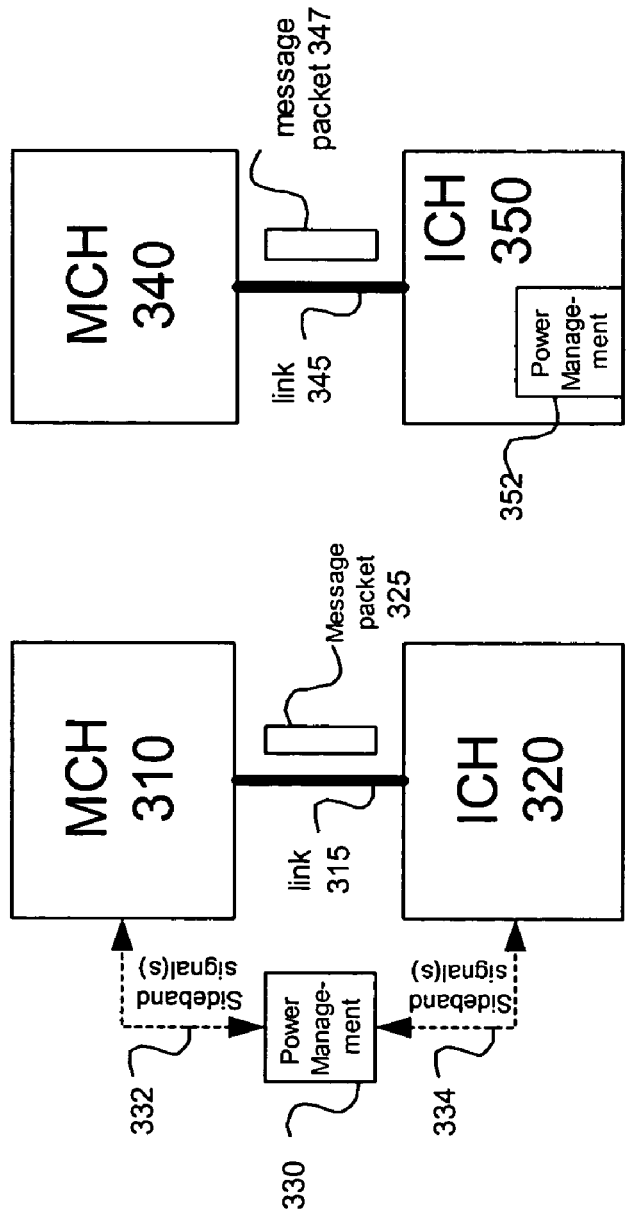
Figure 3B
Figure 3A

TRANSACTION-BASED POWER MANAGEMENT IN A COMPUTER SYSTEM

FIELD OF INVENTION

The present invention relates to computing technology, and more particularly, to power management in a computer system.

BACKGROUND

In a typical computer system, a central processing unit (CPU) of the system supports various power states to allow robust power management in the system. For example, a CPU may support five power states, such as the C0, C1, C2, C3, and C4 states. In one system, the C0 state is an active power state, in which the CPU executes instructions, while the remaining states, i.e., the C1, C2, C3, and C4 states, are sleeping states. In the sleeping states, the CPU consumes less power and dissipates less heat than in the C0 state because the CPU does not execute any instruction while in the sleeping states. Furthermore, the power consumption in the C4 state is generally less than the power consumption in the C3 state because the CPU supply voltage is lowered when the CPU enters into the C4 state.

Each sleeping state has a latency associated with entering and exiting and is related to the power saving in each state. In general, the more circuitry or logic being shutdown to save more power, the more effort and longer exit latency are consumed to re-energize the circuitry and/or logic shutdown. For example, the phase lock loop (PLL) and input/output (IO) of a CPU can be shut down to save more power when the CPU is in the C3 or C4 state because the CPU does not snoop while in the C3 or C4 state. However, it typically takes longer to re-energize the PLL and IO after the CPU exits from the C3 or C4 state.

In an exemplary system, the CPU can access the memory during the C0 state or snoop bus-master initiated memory traffic while in the C1 or C2 state. The bus master is a peripheral device having control of the bus at a given time, such as, for example, an external graphic core. The data movement from one device to another over a bus is, therefore, referred to as a bus mastering event. In contrast, in the C3 or C4 state, the CPU suspends snooping or memory access as part of the deeper sleep states. In order to snoop the bus-master initiated memory traffic, a CPU in either the C3 or C4 state has to exit the C3 or C4 state. Because of the higher exit latency of the C3 and C4 states, the system has to verify whether there is an on-going bus mastering event from any peripheral device in the system that may require the CPU to snoop before entering either the C3 or C4 state. If there is an on-going bus mastering event, the CPU has to settle for a power state (e.g., C1 or C2) with higher power consumption but lower exit latency than the C3 or C4 state.

As to the peripheral device, it may be coupled to the CPU through a root complex device via a serial interconnect, such as a PCI EXPRESS interconnect. A root complex device includes a host bridge and one or more root ports. Examples of a root complex device include a memory controller or IO controller functional device. An interconnect is an infrastructure that couples one device to another. PCI EXPRESS is a high speed, point-to-point serial interconnect standard. For example, the first generation of PCI EXPRESS interconnect supports 2.5 Gb/sec per lane data transmission. In one exemplary system, a graphic device is coupled to a chipset of the system (e.g., a memory controller hub) through a 16-lane PCI Express interconnect.

Furthermore, PCI EXPRESS allows flow control by supporting an accounting scheme with credits to keep track of the traffic over a PCI EXPRESS interconnect. The credits indicate the available buffering in a device for various types of transactions over an interconnect. For example, a memory controller can report to the software of the capability of a root complex device to transmit data by writing the information in a number of registers. According to PCI EXPRESS protocol, there are a number of prescribed credits for various transactions, such as, read request, write request, completion, etc. For example, when a graphic device issues transactions (e.g., read requests) towards the root complex device and these transactions are pending, a credit is consumed to reflect the amount of buffering taken up in the memory controller by the pending transactions. When these transactions are handled or retired by the memory controller, the credit is released or freed up. The number of pending transactions, as reflected by the credits consumed, indicates the likelihood of a bus mastering event that may prohibit entry into the C3 or C4 state.

A prior art technique to indicate on-going bus mastering traffic uses a sideband signal. For example, a graphic device sends a signal AGP_BUSY to the root complex device of the computer system to indicate on-going bus mastering traffic for the system that attaches the graphic device using Accelerated Graphics Port (AGP). However, the sideband signals are costly because they require one additional pin per sideband signal on each device. Furthermore, permanent connector infrastructure has to be provided for the sideband signals in the system even though future technological innovation may not use such sideband signals at all.

BRIEF DESCRIPTION OF THE DRAWINGS

The present invention will be understood more fully from the detailed description that follows and from the accompanying drawings, which however, should not be taken to limit the appended claims to the specific embodiments shown, but are for explanation and understanding only.

FIG. 2A illustrates one embodiment of an entry threshold.

FIG. 2B illustrates one embodiment of an exit threshold.

FIGS. 3A–3C illustrate various embodiments of chipset partition.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

A method and an apparatus for power management in a computer system are disclosed. In one embodiment, the method includes monitoring transactions over an interconnect coupling a chipset device and a peripheral device in the computer system, the transactions being transmitted between the peripheral device and the chipset device following a flow control protocol that allows the chipset device to keep track of the transactions. The embodiment further includes causing a processor in the computer system to exit from a power state if a number of coherent transactions pending in a buffer of the chipset device exceed a predetermined threshold. In a specific embodiment, the flow control protocol is PCI EXPRESS. Other features will be apparent from the accompanying figures and the detailed description that follows.

Figure 1A:
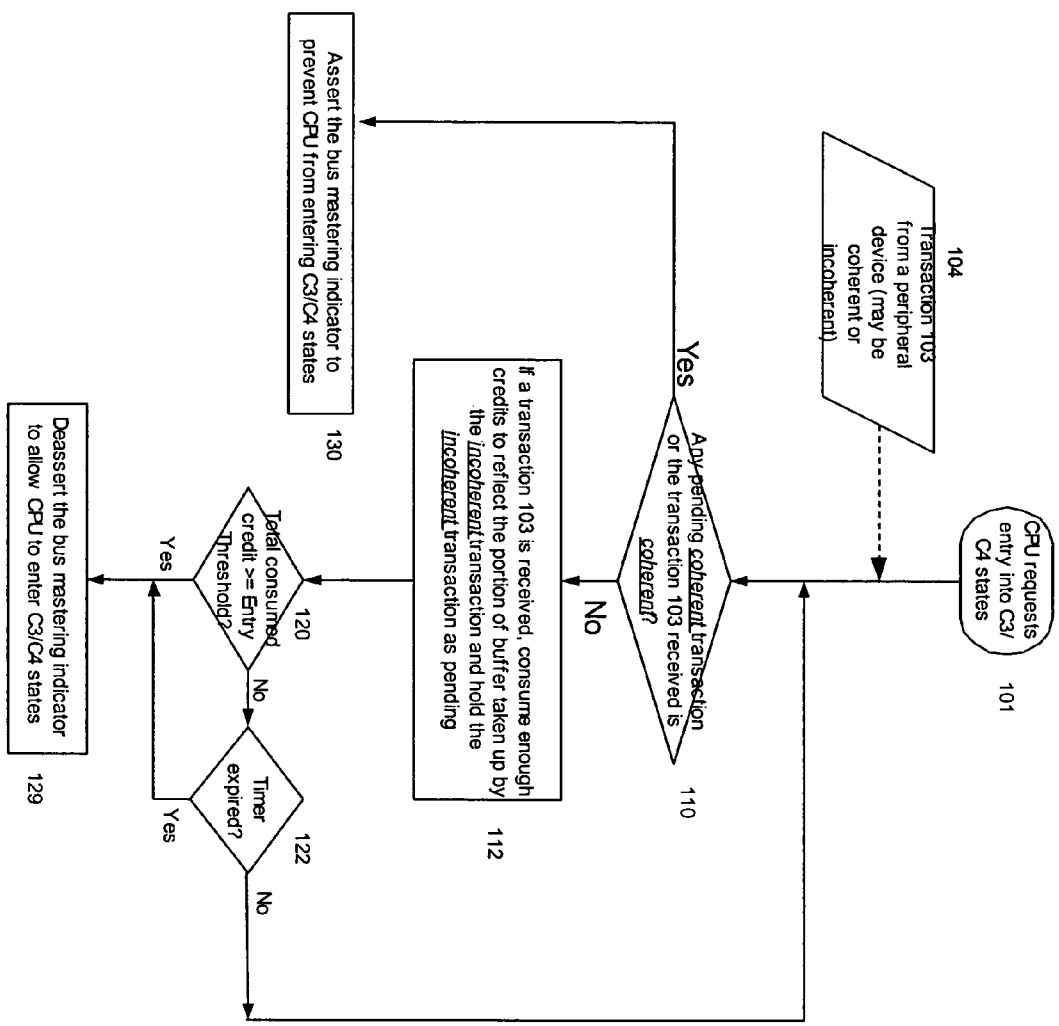
FIG. 1A shows a flow diagram of one embodiment of a process to manage power in a computer system.

FIG. 1A shows a flow diagram of one embodiment of a process to manage power in a computer system. The process is performed by processing logic that may comprise hardware (e.g., circuitry, dedicated logic, etc.), software (such as is run on a general purpose computer system or a dedicated machine), or a combination of both. As discussed above, an exemplary CPU may not initiate memory access or snoop bus-master initiated traffic while in the C3 or C4 state. Therefore, in response to a CPU request to enter either the C3 or C4 state (processing block 101), processing logic performs a series of operations to determine whether the peripheral devices in the system are likely to request the CPU to snoop a bus master or accesses directly to system memory without snooping. Examples of the peripheral devices include an external graphics core, an Ethernet controller, etc. Processing logic may receive a transaction 103 from one of the peripheral devices (processing block 104). The transaction 103 may be coherent or incoherent. A coherent transaction involves data currently or likely being used or modified in the cache of the CPU. In contrast, an incoherent transaction involves data from the memory and the data is currently not being stored, used, or modified in the cache of the CPU.

Referring to FIG. 1A, processing logic checks whether the transaction 103 received is coherent or there is any pending coherent transaction in a memory controller in the computer system (processing block 110). If either is true, then processing logic asserts a bus mastering indicator to prevent the CPU from entering the C3 or C4 state (processing block 130). In one embodiment, the CPU then enters into a default state, which may be the C1 or C2 state.

However, if the transaction 103 received is incoherent and there is no pending coherent transaction in the root complex device, processing logic consumes a number of credits to reflect the portion of buffer in the memory controller taken up by the incoherent transaction 103 and holds the transaction 103 as pending (processing block 112). Processing logic may check whether the total number of credits consumed exceeds or equals to an entry threshold (processing block 120). If the total number of credits consumed exceeds or equals to the entry threshold, the portion of the buffer in the root complex device filled by the pending transactions has exceeded a certain level corresponding to the entry threshold. With less available buffering in the memory controller, the peripheral device is less likely to send additional transactions to the memory controller. Thus, the CPU is less likely to be requested to snoop, and hence, the CPU may enter into either the C3 or C4 state. As a result, processing logic de-asserts the bus mastering indicator to allow the CPU to enter into either the C3 or C4 state (processing block 129).

On the other hand, if the total number of credits consumed is less than the entry threshold, processing logic may check whether a timer has expired (processing block 122). If the timer has expired, processing logic de-asserts the bus mastering indicator to allow the CPU to enter into either the C3 or C4 state (processing block 130). Otherwise, processing logic repeats processing block 110. Alternatively, processing logic may not check the timer at all and may simply repeat processing block 110 upon the determination that the total number of consumed credits is below the entry threshold.

FIG. 2A illustrates one embodiment of the entry threshold. The entry threshold 210 may be set to modify the bus mastering indicator to cause an exemplary CPU to enter into the C3 or C4 state even when there are pending incoherent transactions in the root complex device. In other words, the transactions may be intentionally held pending in the memory controller with no service attempted until the number of credits consumed exceeds or equals to the entry threshold 210 in order to defer asserting the bus mastering indicator to the CPU. As a result, the CPU has more opportunities to enter into either the C3 or C4 state to reduce average CPU power consumption. The entry threshold 210 may be set at 0% for highly performance sensitive applications, such as graphic applications.

However, in a mobile system, such as a laptop computer, the entry threshold may be set at different values depending on the amount of charge remaining in one or more batteries of the system when the system is running solely on such batteries. It is noted that the tradeoff for lower CPU power consumption may be degraded CPU performance state. Furthermore, in one embodiment, a timer is used to qualify how long to stall servicing the initial pending transaction in order to mitigate the impact of the tradeoff on some latency sensitive applications. If the timer expires before the entry threshold 210 is reached, then the bus mastering indicator may be reset to allow the CPU to enter the C3 or C4 state for light traffic or idle cases.

Figure 1B:
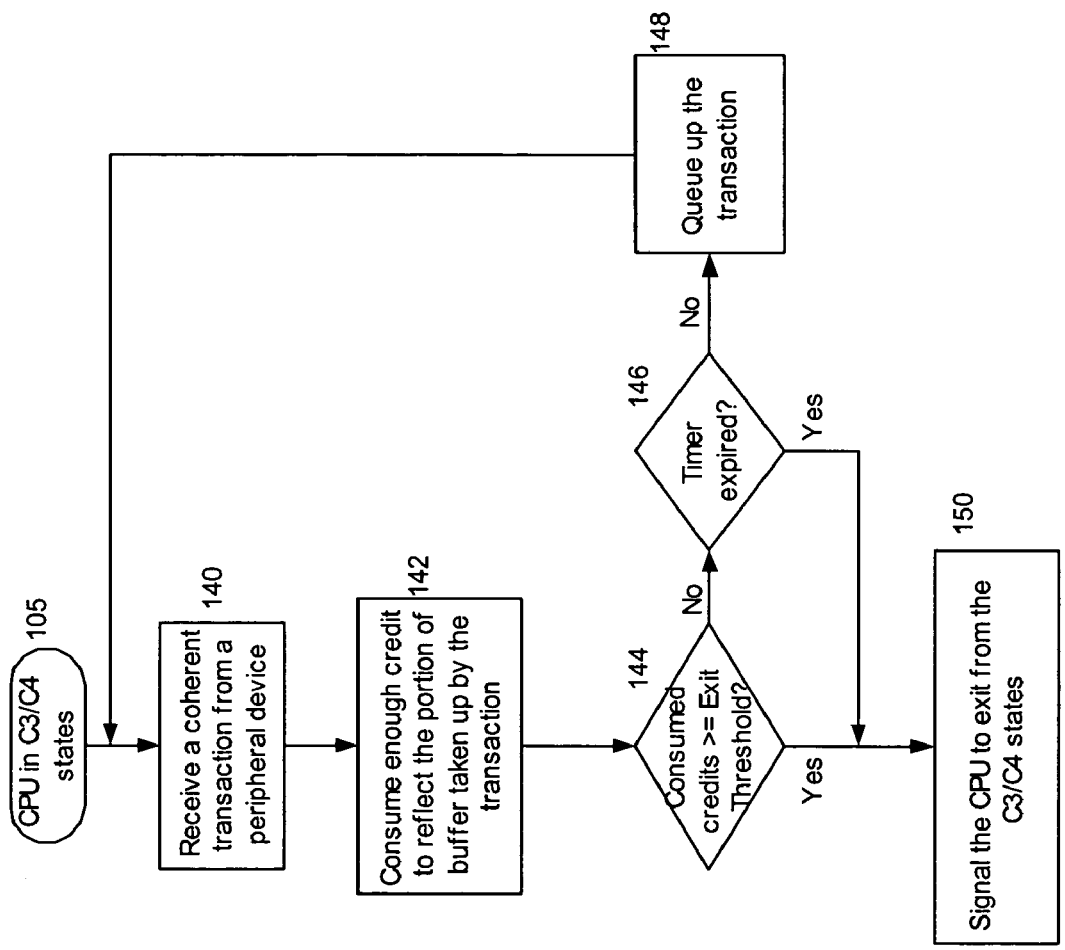
FIG. 1B shows a flow diagram of one embodiment of a process to manage power in a computer system.

FIG. 1B shows a flow diagram of one embodiment of a process to manage power in a computer system. The process is performed by processing logic that may comprise hardware (e.g., circuitry, dedicated logic, etc.), software (such as is run on a general purpose computer system or a dedicated machine), or a combination of both. When the CPU is in either the C3 or C4 state (processing block 105), processing logic may receive a coherent transaction from a peripheral device (processing block 140). Examples of the peripheral device include an external graphic core, an Ethernet controller, etc. Upon receipt of the coherent transaction, processing logic consumes a number of credits to reflect the portion of buffer taken up by the coherent transaction received (processing block 142). Then processing logic checks whether the total number of consumed credits for the coherent transactions exceeds or equals to an exit threshold (processing block 144). If the total number of the consumed credits exceeds or equals to the exit threshold, processing logic causes the CPU to exit from either the C3 or C4 state (processing block 150). Processing logic may send a signal to the CPU to instruct the CPU to exit from either the C3 or C4 state. After exiting from the C3 or C4 state, in one embodiment, the CPU enters the C0 state.

However, if the total number of the consumed credits does not exceed or equal to the exit threshold, processing logic checks whether a timer has expired (processing block 146). If the timer has expired, processing logic causes the CPU to exit from either the C3 or C4 state (processing block 150). Otherwise, processing logic queues up the transaction (processing block 148) and repeats processing block 140. Alternatively, processing logic may not check the timer at all and may simply queue up the transaction (processing block 148) and repeat processing block 140 upon the determination that the total number of consumed credits is below the exit threshold.

FIG. 2B illustrates one embodiment of the exit threshold. Referring to FIG. 2B, the exit threshold 250 is set to decide when to set the bus mastering indicator to cause an exemplary CPU to exit from either the C3 or C4 state. Transactions may be queued up when the CPU is in the C3 or C4 state to allow the CPU to spend a certain period of time in the C3 or C4 state in order to achieve a certain level of power saving. If the number of consumed credits is below the exit threshold 250, then the CPU is held off from being notified that an exit condition has occurred. In one embodiment, a timer is used to qualify how long to stall servicing the initial pending transactions if the applications are latency sensitive. Once the timer expires, a signal is sent to cause the CPU to exit from the C3 or C4 state even if the total number of consumed credits corresponding to the pending coherent transactions is less than the exit threshold 250. Likewise, for some highly performance sensitive applications, the exit threshold 250 may be set at 0% in order to meet the performance specifications of such applications. Furthermore, in some embodiments, the exit threshold 250 is set at different values depending on the remaining battery charge capacity in the system when the battery alone powers the system.

One should appreciate that there are multiple ways to define the entry and exit thresholds. In one embodiment, the entry threshold substantially equals to the exit threshold. For instance, to run a performance-oriented application, the entry and exit thresholds may be hardwired to a single value at 0%.

In an alternate embodiment, the entry and exit thresholds are set at different values. For instance, the entry threshold may be higher than the exit threshold. Furthermore, allowing the entry and exit thresholds to be set at different values on the fly enables the CPU to adjust performance based on the remaining battery charge capacity. In addition, the CPU may modify the entry and exit behavior of the CPU adaptively through threshold modification. Adaptive modification of the entry and exit thresholds allows the CPU to steer away from frequent thrashing of low power states because of certain periodic traffic that may coincide with the timing of the C3 or C4 state entry decision. Another advantage is to provide for asymmetric entry and exit behavior to tune and increase the residency period of the CPU in either the C3 or C4 state. For example, the CPU may take hundreds of microseconds to exit the C3 or C4 state, during which a phase lock loop of the CPU may consume twice the power consumed during the initial ten microseconds to spin up. Therefore, if the C3 or C4 residency of the CPU is less than the exit latency, the net effect may be little or negligible power saving, or worse, more power consumption.

FIGS. 3A–3C illustrate various embodiments of chipset partitions in a computer system. FIG. 3A shows a memory controller 310, an input/output controller 320, and power management circuitry 330. The power management circuitry 330 is outside of both the memory controller 310 and the input/output controller 320. The memory controller 310 is coupled to the input/output controller 320 via a link 315. The link 315 may include a digital media interface (DMI) link. The memory controller 310 is further coupled to one or more peripheral devices (not shown) via one or more buses or interconnects (not shown) that adopt a protocol with a credit-based flow control accounting scheme, such as, for example, PCI EXPRESS.

In one embodiment, the power management circuitry 330 communicates with the memory controller 310 and/or the input/output controller 320 via the sideband signals 332 and 334. The sideband signals 332 and 334 indicate whether there is any bus mastering activity from a peripheral device, such as an advance graphic port (AGP). The sideband signals 332 and 334 are typically denoted as XX_BUSY. For example, the sideband signal corresponding to the AGP is denoted as AGP_BUSY. One should appreciate that the sideband signals may include one or more shared signals.

In one embodiment, one of the memory controller 310 and the input/output controller 320 acts as a central agent to roll up the bus mastering activity information through one or more message packets sent between the memory controller 310 and the input/output controller 320. The message packets may include DMI message packets 325. However, the central agent still communicates with the power management circuitry 330 via one of the sideband signals 334 and 332.

FIG. 3B shows an alternate embodiment of chipset partition in a computer system. The chipset in FIG. 3B includes a memory controller 340 and an input/output controller 350 coupling to each other via a look 345, which may include a DMI link. However, one should appreciate that some embodiments of the chipset include additional devices not shown. The memory controller 340 is further coupled to a peripheral device (not shown) via an interconnect (not shown) adopting a credit-based flow control accounting scheme, such as, for example, PCI EXPRESS. The peripheral device may include an external graphic core, an Ethernet controller, etc. The input/output controller 350 includes power management circuitry 352 to monitor data traffic over the interconnect. Since the power management circuitry 352 is internal to the input/output controller 350, the memory controller 340 has to communicate to the input/output controller 350 on whether the peripheral device has any ongoing traffic over the interconnect. In one embodiment, the memory controller 340 sets one or more bits in a message packet 347 sent via the link 345 to the input/output controller 350. The message packet 347 may be a DMI packet. Setting the bit(s) in the message packet 347 is also referred to as in-band virtualization of the bus mastering indicator signal, as opposed to the sideband signals (e.g., sideband signals 332 and 334 in FIG. 3A), because the signal is abstracted to eliminate the pin and connector infrastructure on both of the controllers 340 and 350. Furthermore, the power management circuitry 352 may also monitor the bus mastering activity from other peripheral devices (not shown) coupled to the input/output controller 350 via other interconnects (not shown).

FIG. 3C shows an alternate embodiment of a chipset partition in a computer system. The chipset shown in FIG. 3C includes an integrated memory and input/output controller 360. The integrated memory and input/output controller 360 includes internal power management circuitry 365. Since the power management circuitry 365 is part of the integrated controller 360, the bus mastering indications for peripheral devices coupled to the controller 360 may be internally registered through logic circuitry within the controller 360.

One should appreciate that the various embodiments of chipset partition in FIGS. 3A–3C are merely shown to illustrate the technique disclosed. The technique disclosed may be applied to other embodiments of computer chipset partition.

Figure 4:
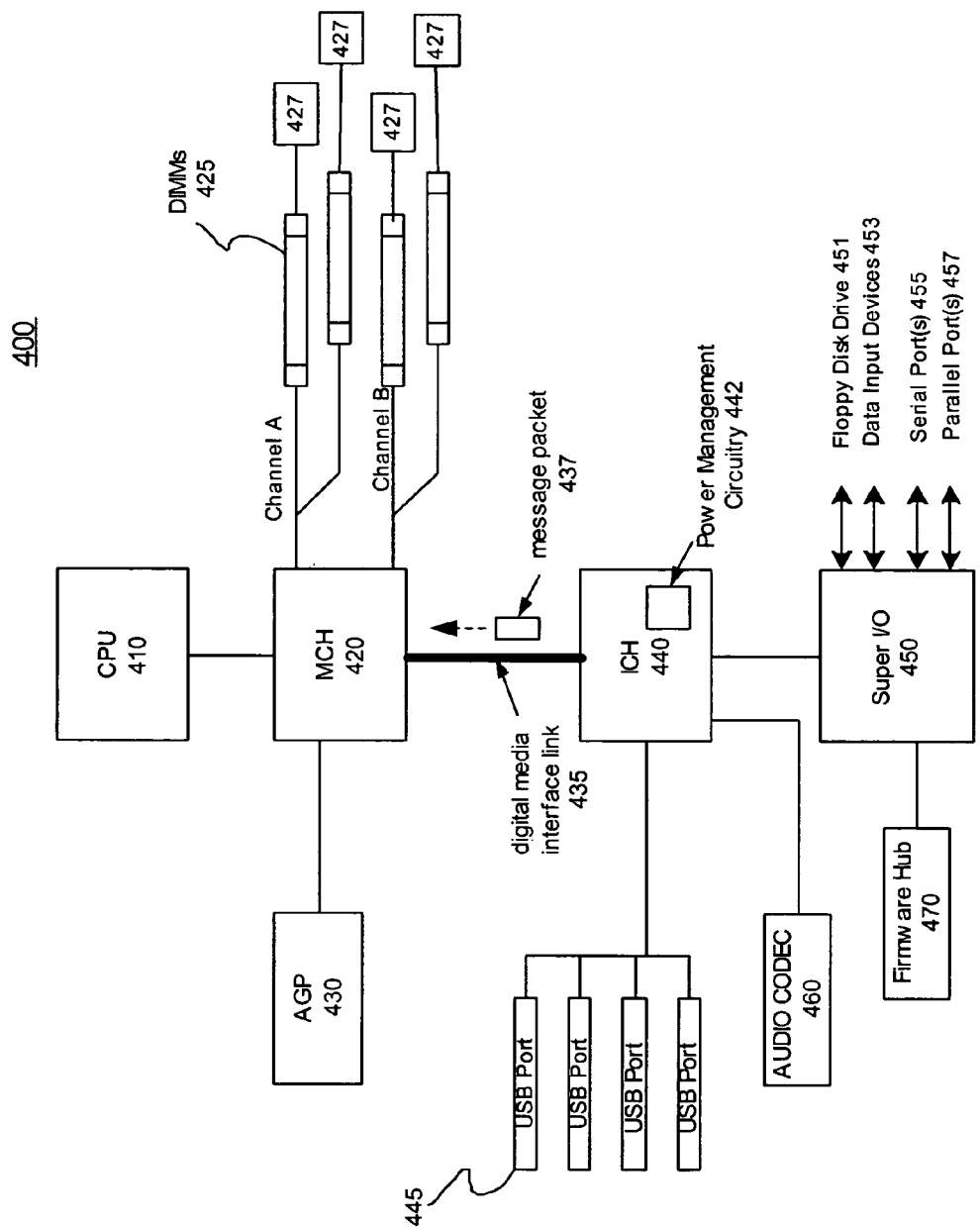
FIG. 4 shows an exemplary embodiment of a computer system.

FIG. 4 shows an exemplary embodiment of a computer system 400. The computer system 400 includes a central processing unit (CPU) 410, a memory controller (MCH) 420, a number of dual in-line memory modules (DIMMs) 425, a number of memory devices 427, a PCI EXPRESS graphic port 430, an input/output controller (ICH) 440, a number of Universal Serial Bus (USB) ports 445, an audio coder-decoder (AUDIO CODEC) 460, a Super Input/Output (Super I/O) 450, and a firmware hub (FWH) 470.

In one embodiment, the CPU 410, the PCI EXPRESS graphic port 430, the DIMMs 425, and the ICH 440 are coupled to the MCH 420. The link 435 between the MCH 420 and the ICH 440 may include a DMI link. The MCH 420 routes data to and from the memory devices 427 via the DIMMs 425. The memory devices 427 may include various types of memories, such as, for example, dynamic random access memory (DRAM), synchronous dynamic random access memory (SDRAM), double data rate (DDR) SDRAM, or flash memory. In one embodiment, each of the DIMMs 425 is mounted on the same motherboard (not shown) via a DIMM connector (not shown) in order to couple to the MCH 420. In one embodiment, the USB ports 445, the AUDIO CODEC 460, and the Super I/O 450 are coupled to the ICH 440. The Super I/O 450 may be further coupled to a firmware hub 470, a floppy disk drive 451, data input devices 453, such as, a keyboard, a mouse, etc., a number of serial ports 455, and a number of parallel ports 457.

In one embodiment, the ICH 440 includes power management circuitry 442 to monitor data traffic over various interconnects coupling the ICH 440 and the MCH 420 to the peripheral devices, such as, for example, the PCI EXPRESS graphic port 430. The power management circuitry 442 may generate a bus mastering indicator to be sent as a virtualized signal within a message packet 437 from the MCH 420 to the ICH 440 via the link 435. Alternatively, the MCH 420 and the ICH 440 may be integrated into a single controller with power management circuitry such that the bus mastering indicator may be internally registered through logic.

In an alternate embodiment, the MCH 420 and the ICH 440 remain as separate devices and the power management circuitry is external to both of the MCH 420 and the ICH 440. Either one of the MCH 420 and the ICH 440 may act as a central agent to roll up information of bus traffic from the peripheral devices in the system 400 from the other controller using message packets sent between the controllers 420 and 440. Furthermore, the central agent may communicate the information to the external power management circuitry via one or more sideband signals.

Note that any or all of the components and the associated hardware illustrated in FIG. 4 may be used in various embodiments of the computer system 400. However, it should be appreciated that other configuration of the computer system may include one or more additional devices not shown in FIG. 4. Furthermore, one should appreciate that the technique disclosed is applicable to different types of system environment, such as a multi-drop environment or a point-to-point environment. Likewise, the disclosed technique is applicable to both mobile and desktop computing systems.

The foregoing discussion merely describes some exemplary embodiments of the present invention. One skilled in the art will readily recognize from such discussion, the accompanying drawings and the claims that various modifications can be made without departing from the spirit and scope of the appended claims. The description is thus to be regarded as illustrative instead of limiting.

What is claimed is:

1. A method to manage power in a system, the method comprising:
monitoring transactions over an interconnect coupling a chipset device and a peripheral device in the system, the transactions being transmitted between the peripheral device and the chipset device according to a flow control protocol that allows the chipset device to keep track of the transactions;
causing a processor in the system to exit from a power state if a plurality of coherent transactions pending in a buffer of the chip set device exceeds a first threshold; and
de-asserting an indicator within a message packet to allow the processor to enter into the power state in response to a request from the processor to enter into the power state if a plurality of incoherent transactions pending in the buffer of the chipset device exceeds a second threshold.

2. The method of claim 1, further comprising:
determining whether a predetermined period of time has passed if the plurality of coherent transactions pending in the buffer does not exceed the first threshold; and
causing the processor to exit from the power state if the predetermined period of time has passed.

3. The method of claim 1, further comprising:
asserting the indicator within the message packet to prevent the processor from entering the power state if the plurality of incoherent transactions pending in the buffer of the chipset device exceeds the second threshold.

4. The method of claim 1, further comprising:
determining whether a second predetermined period of time has passed if the plurality of incoherent transactions pending in the buffer of the chipset device is below the second threshold; and
deasserting the indicator within the message packet to allow the processor to enter the power state if the second predetermined period of time has passed.

5. The method of claim 1, wherein the first threshold is substantially equal to the second threshold.

6. The method of claim 1, wherein the first threshold is lower than the second threshold.

7. The method of claim 1, wherein the first threshold is higher than the second threshold.

8. The method of claim 1, wherein the flow control protocol is Peripheral Component Interconnect (PCI) Express.

9. The method of claim 1, wherein the chipset device comprises a memory controller.

10. The method of claim 1, wherein the chipset device comprises an input/output controller.

11. An apparatus in a computing system, the apparatus comprising:
power management circuitry to monitor transactions over an interconnect coupling a root complex device and a peripheral device in the computing system, the transactions being transmitted between the peripheral device and the root complex device according to a flow control protocol to allow the root complex device to keep track of the transactions transmitted; and
a digital media interface coupled to the root complex device to send a first message packet to the root complex device to cause a processor in the computing system to exit from a power state if a plurality of coherent transactions pending in a buffer of the root complex device exceeds a first threshold, wherein in response to a request from the processor to enter into the power state, the power management circuitry de-asserts an indicator within a second message packet to allow the processor to enter into the power state if a plurality of incoherent transactions pending in the buffer of the root complex device exceeds a second threshold.

12. The apparatus of claim 11, wherein in response to the request from the processor, the power management circuitry asserts the indicator within the second message packet to prevent the processor from entering the power state if the plurality of incoherent transactions pending in the buffer of the root complex device is below the second threshold.

13. The apparatus of claim 12, further comprising a timer, wherein the power management circuitry asserts the indicator within the second message packet to prevent the processor from entering the power state if the timer has expired.

14. The apparatus of claim 12, wherein the first threshold is substantially equal to the second threshold.

15. The apparatus of claim 11, wherein the flow control protocol includes a credit-based flow control accounting scheme.

16. A semiconductor chip in a computing system, the semiconductor chip comprising:
   a memory controller coupled to a peripheral device in the computing system;
   power management circuitry coupled to the memory controller to monitor transactions between the peripheral device and the memory controller; and
   an input/output controller residing on a common substrate with the memory controller to allow a processor in the computing system to enter into the power state in response to a request from the processor to enter into a power state if a plurality of incoherent transactions pending in a buffer of the memory controller exceeds an entry threshold, to prevent the processor from entering into the power state if the plurality of incoherent transactions is below the entry threshold, and to cause the processor to exit from the power state if a plurality of coherent transactions pending in the buffer of the memory controller exceeds an exit threshold.

17. The semiconductor chip of claim 16, wherein the entry threshold is substantially equal to the exit threshold.

18. The semiconductor chip of claim 16, wherein the entry and exit thresholds are adaptively modifiable.

19. The semiconductor chip of claim 16, wherein the peripheral device is coupled to the memory controller via an interconnect, which adopts a credit-based flow control accounting scheme.

20. The semiconductor chip of claim 16, wherein the peripheral device is coupled to the memory controller via a bus.

21. A system comprising:
   a processor;
   a memory controller coupled to the processor;
   a graphics chip;
   an interconnect coupling the graphics chip to the memory controller;
   an input/output controller, coupled to the memory controller, comprising
      power management circuitry to motor transactions over the interconnect, the transactions being transmitted between the graphics chip and the memory controller according to a flow control protocol; and
   a digital media interface coupled to the memory controller to send a first message packet to the memory controller to cause the processor to exit from a power state if a plurality of coherent transactions pending in a buffer of the memory controller exceeds a first threshold, wherein the power management circuitry de-asserts an indicator within the second message packet in response to a request from the processor to enter into the power state to allow the processor to enter into the power state if a plurality of incoherent transactions pending in the buffer of the memory controller exceeds a second threshold.

22. The system of claim 21, wherein the power management circuitry asserts the indicator within the second message packet in response to the request from the processor to prevent the processor from entering the power state if the plurality of incoherent transactions pending in the buffer of the memory controller is below the second threshold.

23. The system of claim 22, wherein the first threshold is substantially equal to the second threshold.

24. The system of claim 21, wherein the flow control protocol includes a credit-based flow control accounting scheme.

* * * * *

UNITED STATES PATENT AND TRADEMARK OFFICE
CERTIFICATE OF CORRECTION

PATENT NO. : 7,237,131 B2 Page 1 of 1
APPLICATION NO. : 10/749855
DATED : June 26, 2007
INVENTOR(S) : Kwa et al.

It is certified that error appears in the above-identified patent and that said Letters Patent is hereby corrected as shown below:

In column 6, at line 27, delete "look" and insert --link--.

Signed and Sealed this

Thirteenth Day of May, 2008

JON W. DUDAS
*Director of the United States Patent and Trademark Office*